United States Patent
Ward et al.

(10) Patent No.: US 8,218,625 B2
(45) Date of Patent: Jul. 10, 2012

(54) ENCODING, DECODING AND REPRESENTING HIGH DYNAMIC RANGE IMAGES

(75) Inventors: Gregory John Ward, Albany, CA (US); Maryann Simmons, Glendale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1167 days.

(21) Appl. No.: 11/568,030

(22) PCT Filed: Nov. 24, 2004

(86) PCT No.: PCT/CA2004/002199
§ 371 (c)(1),
(2), (4) Date: Jan. 7, 2008

(87) PCT Pub. No.: WO2005/104035
PCT Pub. Date: Nov. 3, 2005

(65) Prior Publication Data
US 2008/0192819 A1 Aug. 14, 2008

Related U.S. Application Data

(60) Provisional application No. 60/564,608, filed on Apr. 23, 2004.

(51) Int. Cl.
H04B 1/66 (2006.01)
H04N 7/12 (2006.01)
H04N 11/02 (2006.01)
G06K 9/38 (2006.01)

(52) U.S. Cl. ............... 375/240.03; 382/251; 382/166

(58) Field of Classification Search .................. None
See application file for complete search history.

(56) References Cited

U.S. PATENT DOCUMENTS

| 4,649,568 A * | 3/1987 | Kiesel et al. ............... 382/162 |
| 5,414,527 A | 5/1995 | Koshi |
| 5,742,892 A | 4/1998 | Chaddha |
| 6,282,311 B1 | 8/2001 | McCarthy |
| 6,282,312 B1 | 8/2001 | McCarthy |

(Continued)

FOREIGN PATENT DOCUMENTS
EP 1341123 A1 9/2003
(Continued)

OTHER PUBLICATIONS

Kevin E. Spaulding, Geoffrey J. Woolfe, Rajan L. Joshi, "Extending the Color Gamut and Dynamic Range of an sRGB Image Using a Residual Image", Wiley Periodicals, Inc., Aug. 2003, pp. 251-266, vol. 28-No. 4.

(Continued)

*Primary Examiner* — Joseph Ustaris
*Assistant Examiner* — Mikhail Itskovich

(57) ABSTRACT

A data structure defining a high dynamic range image comprises a tone map having a reduced dynamic range and HDR information. The high dynamic range image can be reconstructed from the tone map and the HDR information. The data structure can be backwards compatible with legacy hardware or software viewers. The data structure may comprise a JFIF file having the tone map encoded as a JPEG image with the HDR information in an application extension or comment field of the JFIF file, or a MPEG file having the tone map encoded as a MPEG image with the HDR information in a video or audio channel of the MPEG file. Apparatus and methods for encoding or decoding the data structure may apply pre- or post correction to compensate for lossy encoding of the high dynamic range information.

36 Claims, 5 Drawing Sheets

U.S. PATENT DOCUMENTS

| | | | |
|---|---|---|---|
| 6,282,313 | B1 | 8/2001 | McCarthy |
| 6,285,784 | B1 | 9/2001 | Spaulding |
| 6,301,393 | B1 * | 10/2001 | Spaulding et al. ............ 382/240 |
| 6,335,983 | B1 | 1/2002 | McCarthy |
| 6,748,106 | B1 | 6/2004 | Bryant |
| 6,754,384 | B1 | 6/2004 | Spaulding |
| 6,775,407 | B1 | 8/2004 | Gindele |
| 6,781,595 | B2 | 8/2004 | Kobayashi |
| 6,795,585 | B1 | 9/2004 | Parada |
| 6,822,760 | B1 | 11/2004 | Spaulding |
| 6,996,271 | B2 | 2/2006 | Ono |
| 2002/0034255 | A1 * | 3/2002 | Zetts ........................ 375/240.26 |
| 2002/0094127 | A1 * | 7/2002 | Mitchell et al. ............... 382/250 |
| 2006/0158462 | A1 | 7/2006 | Toyama |

FOREIGN PATENT DOCUMENTS

| | | |
|---|---|---|
| JP | 3-222577 A | 10/1991 |
| JP | 2003-158635 A | 5/2003 |
| JP | 2004-29639 A | 1/2004 |

OTHER PUBLICATIONS

Kevin E. Spaulding, Geoffrey J. Woolfe, Rajan L. Joshi, "Using a Residual Image to Extend the Color Gamut and Dynamic Range of an sRGB Image", Eastman Kodak Company, 2003, pp. 1-9.

A. Tanju Erdem, M. Ibrahim Sezan, "Compression of 10-bit video using the tools of MPEG-2", Eastman Kodak Company, Mar. 1995, pp. 27-56, vol. 7-No. 1.

Fredo Durand, Julie Dorsey, "Fast Bilateral Filtering for the Display of High-Dynamic-Range Images", Association for Computing Machinery, Inc., Jul. 2002, pp. 257-266, vol. 21-No. 3.

Greg Ward, Maryann Simmons, "Subband Encoding of High Dynamic Range Imagery", Association for Computing Machinery Inc., Aug. 2004, pp. 83-90.

International Search Report for PCT/CA2004/002199, International Searching Authority, May 10, 2005.

* cited by examiner

ENCODING, DECODING AND REPRESENTING HIGH DYNAMIC RANGE IMAGES

TECHNICAL FIELD

This application claims the benefit of U.S. application No. 60/564,608 filed on 23 Apr. 2004 which is hereby incorporated herein by reference.

TECHNICAL FIELD

The invention relates to high dynamic range digital images. The invention relates specifically to methods and apparatus for encoding and decoding high dynamic range images and to data structures containing digital high dynamic range images.

BACKGROUND

Human vision is capable of appreciating contrast ratios of up to 1:10,000. That is, a person can take in a scene in which some parts of the scene are 10,000 times brighter than other parts of the scene and see details in both the brightest and darkest parts of the scene. Further, human vision can adapt its sensitivity to brighter or darker scenes over a further 6 orders of magnitude.

Most conventional digital image formats (so-called 24-bit formats) use up to 24 bits to store color and luminance information for each pixel in an image. For example, each of a red, green and blue (RGB) value for a pixel may be stored in one byte (8 bits). Such formats are capable of representing brightness variations over only about two orders of magnitude (each byte can store one of 256 possible values). There exist a number of standard formats for representing digital images (which include both still and video images). These include JPEG (Joint Photographic Experts Group), MPEG (Motion Picture Experts Group), AVI (Audio Video Interleave), TIFF (Tagged image File Format), BMP (Bit Map), PNG (Portable Network Graphics), GIF (Graphical Interchange Format), and others. Such formats may be called "output referred standards" because they do not attempt to preserve image information beyond what can be reproduced by electronic displays of the types most commonly available. Until recently, displays such as computer displays, televisions, digital motion picture projectors and the like have been incapable of accurately reproducing images having contrast ratios better than 1:1000 or so.

Display technologies being developed by the assignee, and others, are able to reproduce images having high dynamic range (HDR). Such displays can reproduce images which more faithfully represent real-world scenes than conventional displays. There is a need for formats for storing HDR images for reproduction on these displays and other HDR displays that will become available in the future.

A number of formats have been proposed for storing HDR images as digital data. These formats all have various disadvantages. A number of these formats yield prohibitively large image files that can be viewed only through the use of specialized software. Some manufacturers of digital cameras provide proprietary RAW formats. These formats tend to be camera-specific and to be excessive in terms of data storage requirements.

There is a need for a convenient framework for storing, exchanging, and reproducing high dynamic range images. There is a particular need for such a framework which is backwards compatible with existing image viewer technology. There is a particular need for backwards compatibility in cases where an image may need to be reproduced by legacy devices, such as DVD players, which have hardware-based image decoders.

SUMMARY OF THE INVENTION

One aspect of this invention provides methods for encoding high dynamic range image data. The methods involve obtaining tone map data corresponding to the high dynamic range image data. The tone map data has a dynamic range lower than that of the high dynamic range image data. The method computes ratio data comprising ratios of values in the high dynamic range image data and corresponding values in the tone map data; generates high dynamic range information based on the ratio data; generates tone map information based on the tone map data; and, stores the high dynamic range information and the tone map information in a data structure.

The data structure may be readable by legacy image viewers. The legacy image viewers may read the tone map information and ignore the high dynamic range information. In some embodiments, the data structure comprises a JFIF file and the tone map information comprises a JPEG image. In some embodiments, the data structure comprises a MPEG file and the tone map information comprises a frame of a MPEG video.

Another aspect of the invention provides a data structure for representing a high dynamic range image having an initial dynamic range. The data structure comprises a tone map portion and a high dynamic range information portion. The tone map portion contains tone map information representing the image and has a dynamic range less than the initial dynamic range. The high dynamic range information portion contains information describing ratios of luminance values in the tone map portion to luminance values of the high dynamic range image.

Another aspect of the invention provides apparatus for encoding high dynamic range images.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of this invention provides data structures for representing ODR images (HDR data structures). In preferred embodiments, the HDR data structures permit images to be viewed in a standard dynamic range mode using standard image viewing software and permits high dynamic range versions of the same images to be viewed in a high dynamic range mode using a HDR viewer and appropriate HDR display.

Figure 1:
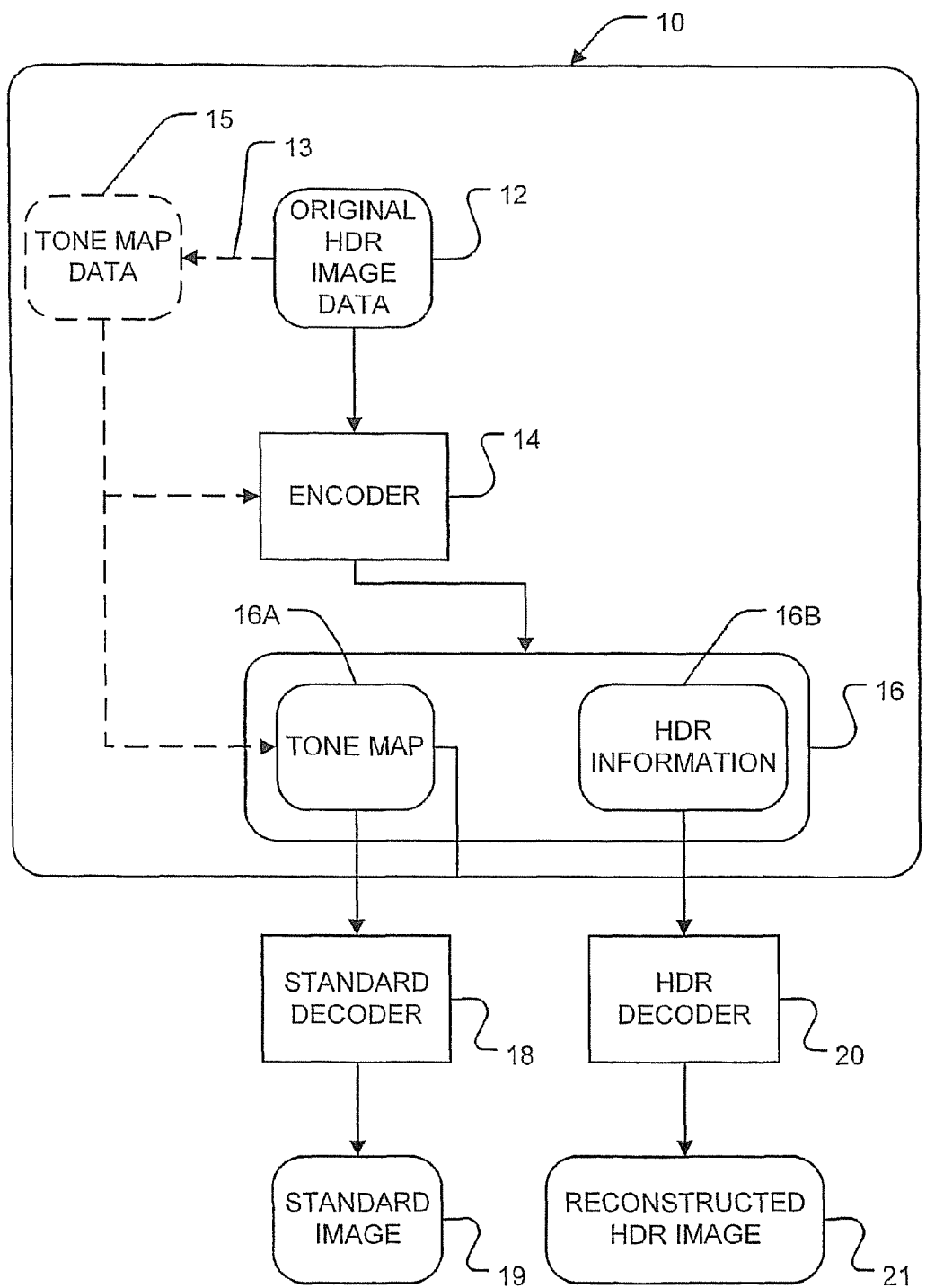
FIG. 1 is a data flow diagram illustrating a method for creating a HDR image file according to a general embodiment of the invention.
Figure 2:
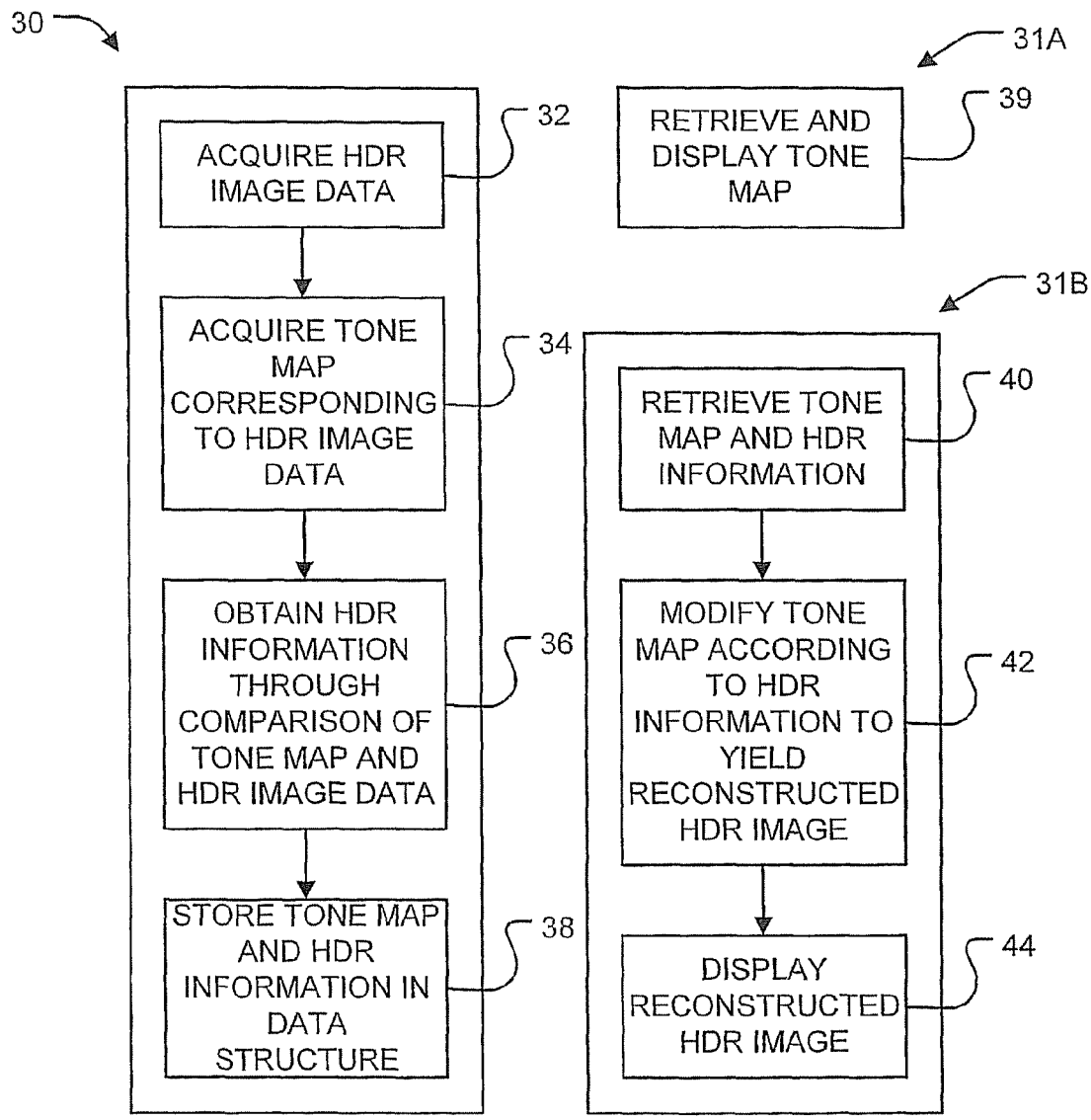
FIG. 2 is a flow chart giving an overview of HDR image encoding and decoding methods according to the invention.

FIG. 1 shows a system 10 according to the invention for creating HDR data structures 16 and for viewing images represented by HDR data structures 16. FIG. 2 shows a method 30 performed by system 10 for creating HDR data structures and alternative methods 31A and 31B for displaying images from data in the HDR data structures 16.

System 10 comprises an encoder 14 for creating a HDR image data structure 16 based on original HDR image data 12. Data structure 16 may be decoded by a standard decoder 18 to provide a standard dynamic range image 19. In some embodiments of the invention Standard decoder 18 comprises a "legacy" hardware decoder or software-based decoder such as suitable image viewer software. Data structure 16 may be decoded by a HDR decoder 20 to yield a reconstructed HDR image 21.

Method 30 begins in block 32 by acquiring HDR image data 12. HDR image data 12 includes information that directly or indirectly specifies the luminance of pixels in an image. HDR image data 12 may be in any suitable format and may be acquired through the use of a suitable HDR camera (possibly by combining multiple exposures) or rendered directly in a computer. The source of HDR image data 12 is not important to the practice of the invention.

Method 30 also obtains (block 34) tone map data 15 corresponding to HDR image data 12. Tone map data 15 represents a likeness of the image of HDR image 12, but has a lower dynamic range than HDR image data 12. Tone map data 15 may be generated from HDR image data 12, as indicated by line 13, or in some other manner derived from data having a common source with HDR image data 12. If tone map data 15 is not derived from HDR image data 12 then the order in which tone map data 15 and HDR image data 12 are obtained (i.e. the order of blocks 32 and 34) is not important.

Encoder 14 generates a data structure 16. Data structure 16 includes a tone map portion 16A, which is based on tone map data 15, and an HDR information portion 16B, which contains information that may be combined by HDR decoder 20 with the data from tone map portion 16A to reconstruct HDR image data 12 or a close approximation thereto. Method 30 generates (block 36) HDR information portion by comparing tone map data 15 (or, equivalently, tone map data reconstructed from tone map portion 16A of data structure 16) and HDR image data 12. In block 38, method 30 stores tone map portion 16A and HDR information portion 16B in data structure 16.

In preferred embodiments of the invention, data structure 16 has a format that can be read by a standard decoder to produce a lower dynamic range (LDR) image. A standard decoder 18 may implement decoding method 31A. Standard decoder 18 generates a standard LDR image 19 by retrieving tone map portion 16A and displaying an image represented by tone map portion 16A (block 39). The standard decoder can ignore HDR information portion 16B.

Data structure 16 can also be read by an HDR decoder 20. HDR decoder 20 implements decoding method 31B and generates an HDR image 21 based upon information from both tone map portion 16A and HDR information portion 16B. Method 31B retrieves data from tone map portion 16A and HDR information portion 16B of data structure 16 in block 40. In block 42, a reconstructed HDR image is created by modifying a tone map extracted from tone map portion 16A according to HDR information from HDR information portion 16B. The reconstructed HDR image is displayed in block 44.

Tone map portion 16A may be in any suitable format. For example, tone map portion 16A may be in JPEG, MPEG, AVI, TIFF, BMP, GIF or some other suitable format. Tone map portion 16A comprises information that directly or indirectly specifies luminance of pixels in the image with a dynamic range that is less than that of original HDR image 12. Where the HDR image data 12 specifies a color image, tone map portion 16A preferably includes information specifying colors for pixels in the image.

In some embodiments of the invention, data structure 16 comprises a JPEG File Interchange Format (JFIF) formatted file. In such embodiments, tone map portion 16A may be contained in the image portion of a JFIF file and HDR information portion 16B may be stored in one or more application extension portions of the JFIF file and/or in one or more comment portions of the JFIF file. In such embodiments any standard JPEG viewer can open data structure 16 and display the image provided in tone map portion 16A at a dynamic range lower than that of the original HDR data 12 or reconstructed HDR image 21.

Standard JPEG viewers ignore application extensions in JFIF files that they do not support. Thus, the presence of HDR information portion 16B has substantially no effect on the viewing of an image from data structure 16 using any standard JPEG viewer. Where HDR information 16B is in a comment field of a JFIF file, HDR information 16B is preferably encoded as ASCII text since some applications may attempt to read comment fields of JFIF files. Such applications may expect the comment fields to contain only text and may behave improperly upon attempting to open a comment field that contains data of all unexpected type. Version 1.2 is one version of JFIF. JFIF version 1.2 is fully described in Annex B of ISO DIS 10918-1, which is hereby incorporated herein by reference.

In some embodiments of the invention, data structure 16 comprises a MPEG formatted file. In such embodiments, tone map portion 16A may be contained in the image portion of a MPEG file and HDR information portion 16B may be stored in one or more application extensions the MPEG file and/or in one or more comment portions of the MPEG file. In such embodiments any standard MPEG viewer can open data structure 16 and display the image provided in tone map portion 16A at a dynamic range lower than that of the original HDR data 12 or reconstructed HDR image 21. One HDR information portion 16B may be associated with each frame of a MPEG video file, or for versions of MPEG which employ keyframes, HDR information portion 16B may be associated only with the keyframes. Conventional MPEG keyframe interpolation techniques may be used to create the inter-keyframe frames (i.e., the frames which are between the keyframes).

Standard MPEG viewers ignore channels of MPEG files that they do not support. Thus, the presence of HDR information portion 16B has substantially no effect on the viewing of an image from data structure 16 using any standard MPEG viewer. Where HDR information 16B is in a comment field of a MPEG file, HDR information 16B is preferably encoded as ASCII text since some applications may attempt to read comment fields of MPEG files. Such applications may expect the comment fields to contain only text and may behave improperly upon attempting to open a comment field that contains data of an unexpected type.

Tone map portion 16A may be created from tone map data 15 in any suitable manner. For example, tone map portion 16A may be generated using a suitable tone mapping operator. The tone mapping operator preferably has the properties that:

a an original HDR input (i.e. original HDR image data 12) is mapped smoothly into a standard dynamic resolution (typically 24-bit) output domain;

no components of the output of the tone mapping operator are clamped at values of 0 or 255;

hue is maintained for each pixel; and, if the tone mapping operator changes saturation values, it makes only mild changes that may be described by invertible functions.

The inventors have found that the bilateral filter described in Durand and Dorsey, *Fast bilateral filtering for the display of high dynamic range images,* ACM Transactions on Graphics, 21, 3, 249-256 (2002) provides a suitable tone mapping operator. Tone map portion 16A may be encoded using a suitable encoder, such as a JPEG encoder or a MPEG encoder.

Tone map portion 16A may represent pixel color values in any suitable manner. For example, pixel color values may be represented as RGB (red, green and blue) values, CMYK (cyan, magenta, yellow and black) values, YCbCr (luminance and chrominance) values, or the like. The data in tone map portion 16A may be compressed using any suitable compression scheme. For example, the data in tone map portion 16A may be compressed in a manner compatible with JPEG or MPEG standards.

In some embodiments of the invention, HDR information portion 16B contains ratios between values specified by tone map portion 16A for individual pixels and the values specified by original HDR image 12 for the same pixels. In such embodiments, HDR information 16B may be generated by dividing the values specified by original HDR image 12 by the corresponding values specified by tone map portion 16A. The data resulting from this operation may be stored as HDR information portion 16B. The precision with which the data values in HDR information portion 16B is represented may be selected to provide acceptable quality in reconstructed HDR images. In some embodiments of the invention the data values in HDR information portion 16B are each represented by one byte (8 bits) prior to compression.

In some embodiments of the invention, HDR information portion 16B specifies relationships between the luminance of pixels in reconstructed HDR image 21 and the luminance specified for corresponding pixels by tone map information 16A. In such embodiments, HDR information portion 16B does not need to contain color information.

HDR information portion 16B may comprise ratios of the luminance specified by original HDR image 12 for areas or pixels within an image to the luminance specified by tone map portion 16A for the corresponding areas or pixels. In such embodiments, color information is carried by tone map portion 16A. In such embodiments, HDR portion 16B can have the same structure as a grey-scale image. For example, where HDR data structure 16 comprises a JFIF file, HDR portion 16B may be encoded as a JPEG grey-scale image. Where HDR data structure 16 comprises a MPEG file, HDR portion 16B may be encoded as a MPEG grey-scale image.

Figure 3:
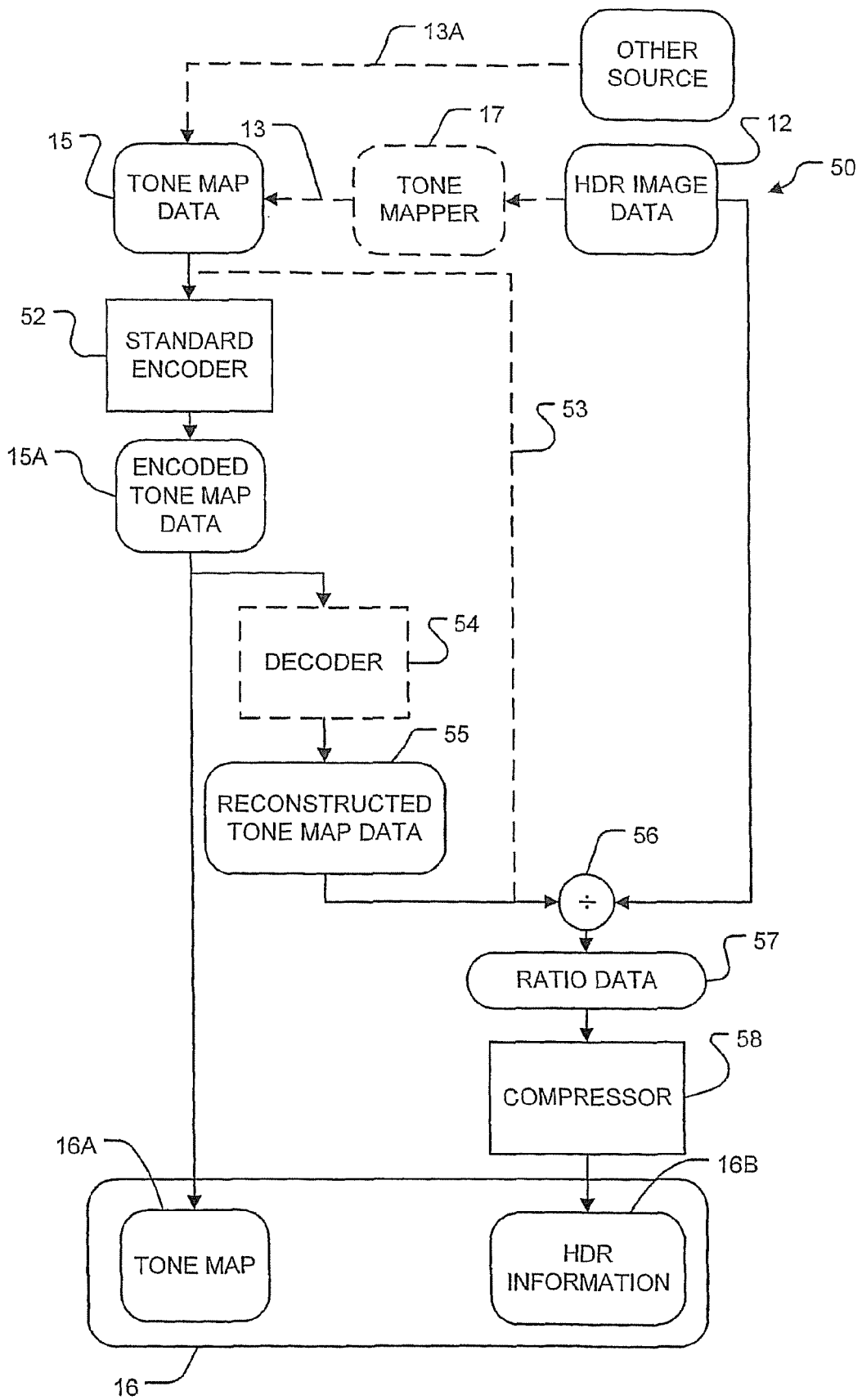
FIG. 3 is a data flow diagram illustrating a method for creating a HDR image file according to one specific embodiment of the invention.

FIG. 3 shows an HDR encoder 50 according to an embodiment of the invention wherein the HDR information used to make HDR portion 16B of data structure 16 comprises ratios of pixel values in HDR image 12 to the corresponding values specified by tone map portion 16A. Encoder 50 receives HDR image data 12. Encoder 50 obtains tone map data 15 either by extracting tone map data 15 from HDR image data 12, as indicated by dashed line 13 and tone mapper 17, or by receiving tone map data 15 from some other source, as indicated by dashed line 13A. Tone mapper 17 preferably does not clip colour or luminance values, and maintains colour and luminance ratios for each pixel in tone map data 15.

In the illustrated embodiment, encoder 50 includes a standard encoder 52. Standard encoder encodes tone map data 15 to produce encoded tone map data 15A. Encoded tone map data 15A call be read with a standard viewer. For example, standard encoder 52 may comprise an encoder that encodes tone map data 15 as JPEG or MPEG encoded tone map data that can be read by a JPEG or MPEG viewer. Encoded tone map data is saved into tone map data portion 16A of HDR data structure 16.

In some embodiments of the invention, encoder 50 receives encoded tone map data 15A from some external source. In such embodiments, encoder 50 does not need to incorporate standard encoder 52.

Encoded tone map data 15A is decoded by decoder 54 to yield reconstructed tone map data 55. HDR image data 12 is divided by reconstructed tone map data 55 by divider 56 to yield ratio data 57. Ratio data 57 is optionally compressed by data compressor 58 to yield HDR information 16B. Data compressor 58 may conveniently comprise a JPEG or MPEG encoder. In some embodiments of the invention, the same JPEG or MPEG encoder is used to encode both tone map portion 16A and HDR information portion 16B of HDR data structure 16.

In some embodiments of the invention, ratio data 57 comprises some function of the ratio of values of HDR image data 12 to corresponding values specified by tone map data 15 (or tone map portion 16A). For example, ratio data 57 may comprise information specifying a logarithm of such a ratio.

In some alternative embodiments of the invention, tone map data 15 is provided directly to divider 56 as indicated by line 53. In such embodiments, decoder 54 is not required. Where tone map portion 16A is encoded using a lossy algorithm, such as JPEG or MPEG encoding, it is preferable to base HDR information portion 16B on reconstructed tone map data 55 instead of on tone map data 15. Basing HDR information portion 16B on reconstructed tone map data 55 permits a more accurate reconstruction of HDR image data 12 from HDR data structure 16 in cases where tone map information portion 16A is encoded by a lossy encoding process. Tone map information portion 16A, rather than tone map data 15 will be used to reconstruct HDR image 21 (FIG. 1).

Compressor 58 may take any of a number of forms. In some embodiments of the invention, compressor 58 performs one or more of the following operations:

downsampling of ratio data 57;

a compressing ratio data 57.

Any suitable form of compression may be used. In a currently preferred embodiment of the invention, compressor 58 both downsamples ratio data 57 and encodes the downsampled ratio data. Where ratio data 57 is downsampled, HDR information portion 16B has an image size smaller than an image size of ratio data 57 or tone map data 15 (i.e. HDR information portion 16B specifies values for a number of pixels that is smaller than a number of pixels for which ratio data 57 or tone map data 15 specifies values). In such cases, HDR information portion 16B has a lower spatial resolution than tone map data 15.

In those embodiments of the invention wherein ratio data 57 is subjected to downsampling, or other lossy compression mechanisms, HDR information 16B may lack all of the details necessary to accurately reconstruct HDR image data 12. Distortions resulting from the lossy compression of ratio data 57 may be at least partially compensated for by applying corrections to tone map portion 16A and/or HDR information portion 16B.

Figure 4:
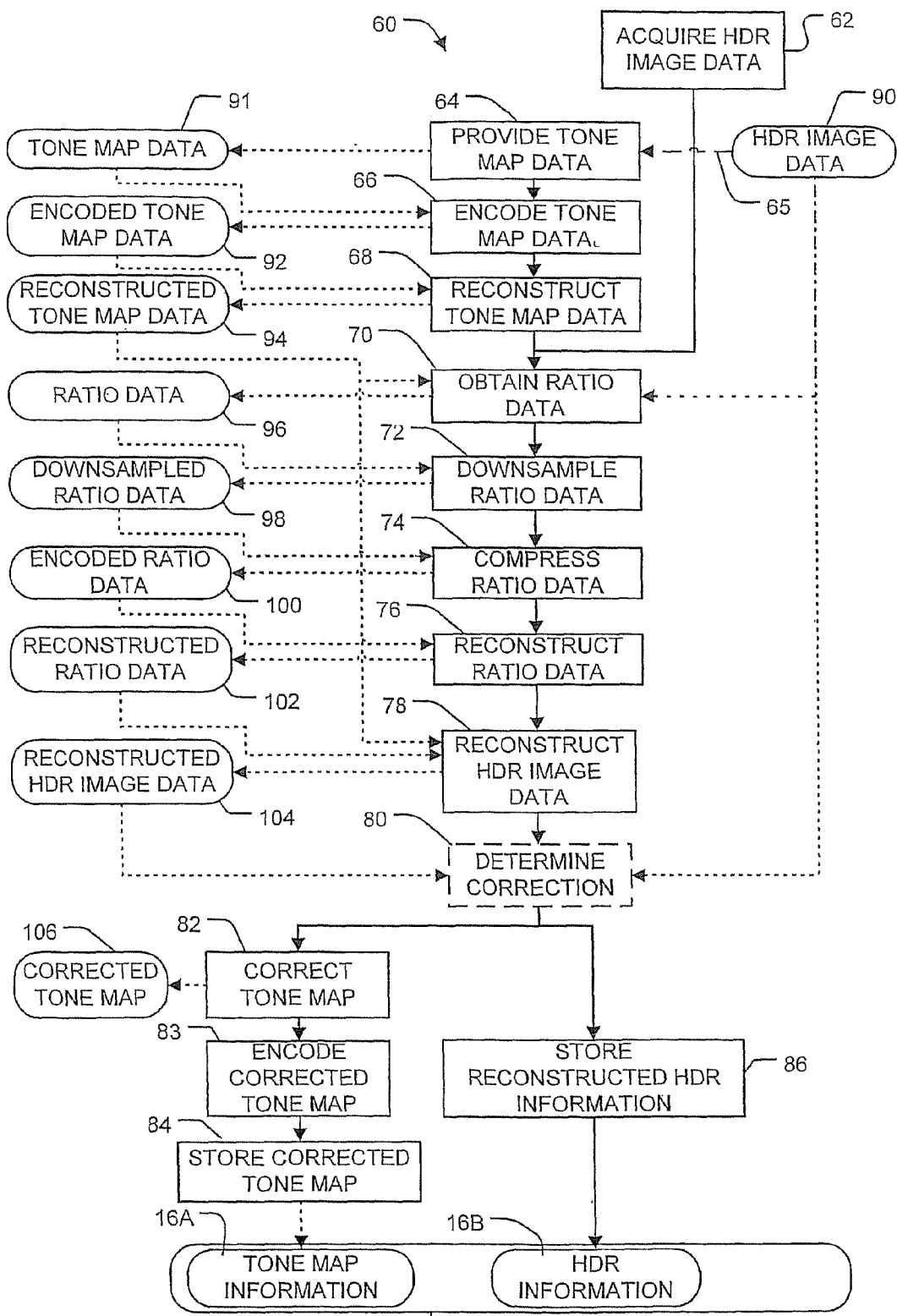
FIG. 4 is a flow chart illustrating methods according to some embodiments of the invention which provide corrections for artefacts resulting from compression and/or downsampling; and, FIG. 5 is a flow chair illustrating a method according to one embodiment of the invention which provides corrections for artefacts resulting from compression and/or downsampling during reconstruction of a HDR image.

FIG. 4 is a flow chart that illustrates the operation of methods 60 which apply corrections to the data in tone map portion 16A or HDR information portion 16B to reduce artefacts resulting from lossy encoding of tone map portion 16A and/or HDR information portion 16B. Methods 60 acquire HDR image data 90 and tone map data 91 in blocks 62 and 64. HDR image data 90 and tone map data 91 may be obtained in any suitable maimer including those manners described above. In some embodiments, tone map data 91 is extracted from HDR image data 90 as indicated by arrow 65.

In block 66, tone map data 91 is encoded to yield encoded tone map data 92. In some embodiments of the inventions encoding block 66 comprises JPEG or MPEG encoding. Subsequently, in block 68, encoded tone map data 92 is decoded to yield reconstructed tone map data 94. Reconstruction block 68 may comprise passing encoded tone map data 92 to a suitable decoder, such as a JPEG or MPEG decoder in the case that block 66 comprises JPEG or MPEG encoding.

Block 70 generates ratio data 96 by applying a function which takes as inputs values from HDR image data 90 (first values) and corresponding values from reconstructed tone map data 94 (second values). The function includes dividing the first values by the second values or vice versa. In a simple embodiment of the invention, ratio data 96 includes a value RI for each pixel in an image given by:

$$RI(x, y) = \frac{L(HDR(x, y))}{L(TM(x, y))} \quad (1)$$

where: (x, y) are coordinates identifying a pixel; L is a function which returns the luminance of the pixel from data for the pixel; HDR(x, y) is the pixel data in HDR image data 90 at coordinates (x, y); and, TM(x, y) is the pixel data in reconstructed tone map data 94 (or, tone map data 91) for the pixel at coordinates (x, y). In some embodiments, the ratio data stores the logarithm of RI, the square root of RI or another function of RI.

Blocks 72 and 74 encode ratio data 96. In this example embodiment, the encoding includes downsampling ratio data 96 in block 72 to yield downsampled ratio data 98 and then compressing downsampled ratio data 98 to yield encoded ratio data 100. The amount of downsampling performed in block 72 may be selected based upon the competing goals of making HDR image portion 16B small and making a HDR image reconstructed from HDR data structure 16 reproduce HDR image data 90 with the highest fidelity. In some embodiments of the invention, ratio data 96 is downsampled sufficiently that downsampled ratio data 98 has fewer pixels than ratio data 96 by a factor in the range of 4 to 15.

For example, downsampling may be performed using a Gaussian filter kernel, which follows a weighting formula of $e^{-(x^2/R^2)}$, where x is the distance from the output pixel's centre in the input image and R is a downsampling radius. The downsampling radius may be defined as the area under which the weights of the contributing input pixels sum to a significant portion of the total value of the output pixel.

Any suitable form of data compression may be performed in block 74. In some embodiments of the invention, block 74 performs JPEG encoding. In other embodiments of the invention, block 74 performs MPEG encoding.

In block 76, reconstructed ratio data 102 is created by decoding encoded ratio data 100. Reconstructed ratio data 102 will typically not be identical to ratio data 96 because of data loss in blocks 74 and 76.

In block 78 reconstructed HDR image data 104 is created by applying, to reconstructed ratio data 102, the inverse of the function applied in block 70 to the ratio data and then, for each pixel, multiplying the luminance for the pixel in reconstructed tone map data 94 by the result. For example, where ratio data 96 stores the values RI as defined in Equation (1) then reconstructed HDR image data 104 may be obtained by multiplying the luminance for each pixel in reconstructed tone map data 94 by the corresponding value of RI from reconstructed ratio data 102. For example, where the ratio data stores the natural logarithm values ln(RI), reconstructed HDR image data 104 may be obtained by raising e, the base of natural logarithms, to the power of the value in reconstructed ratio data 102 and then multiplying the result by the luminance for each pixel in reconstructed tone map data 94.

Reconstructed HDR image data 104 will differ from original HDR image data 90 because reconstructed ratio data 102 is not identical to original ratio data 96 and, usually less importantly, because of rounding errors in ratio data 96. Block 80 optionally compares reconstructed HDR image data 104 to original HDR image data 90 to determine if any correction is required and to determine how the correction will be performed. Correction may be performed by correcting the data of tone map portion 16A and/or by correcting the data of HDR information portion 16B. Some methods simply perform one or the other of these corrections.

Block 82 obtains corrected tone map data 106. Corrected tone map data 106 can be obtained by dividing original HDR image data 90 by reconstructed ratio data 102. Corrected tone map data 106 can then be encoded, if necessary, as indicated by block 83 and stored as tone map data portion 16A of HDR data structure 16 in block 84. This precorrection may be performed at any time after reconstructed ratio data 102 is available. For many purposes, this precorrection does not degrade significantly the image that can be seen by viewing tone map data portion 16A with a conventional image viewer. This correction tends make the image represented by tone map portion 16A somewhat sharper than would be the case in the absence of this correction. Reconstructed HDR image data 104 may be stored as HDR information portion 16B of HDR data structure 16 in block 86.

In some cases it is undesirable to alter the tone map data stored in tone map portion 16A. For example, encoded tone map data 92 may have been carefully optimized to provide the best image quality when viewed with a particular viewer, such as, for example, the MPEG decoder in a DVD player. In such cases, encoded tone map data 92 may be stored in tone map portion 16A of data structure 16 and ratio data 96 may be stored in HDR information portion 16B of HDR data structure 16. Corrections to the appearance of an HDR image produced from data structure 16 may be made by correcting HDR information portion 16B upon reconstruction of the HDR image. For example the data in HDR information portion 16B may be corrected by a viewer capable of processing HDR images.

Figure 5:
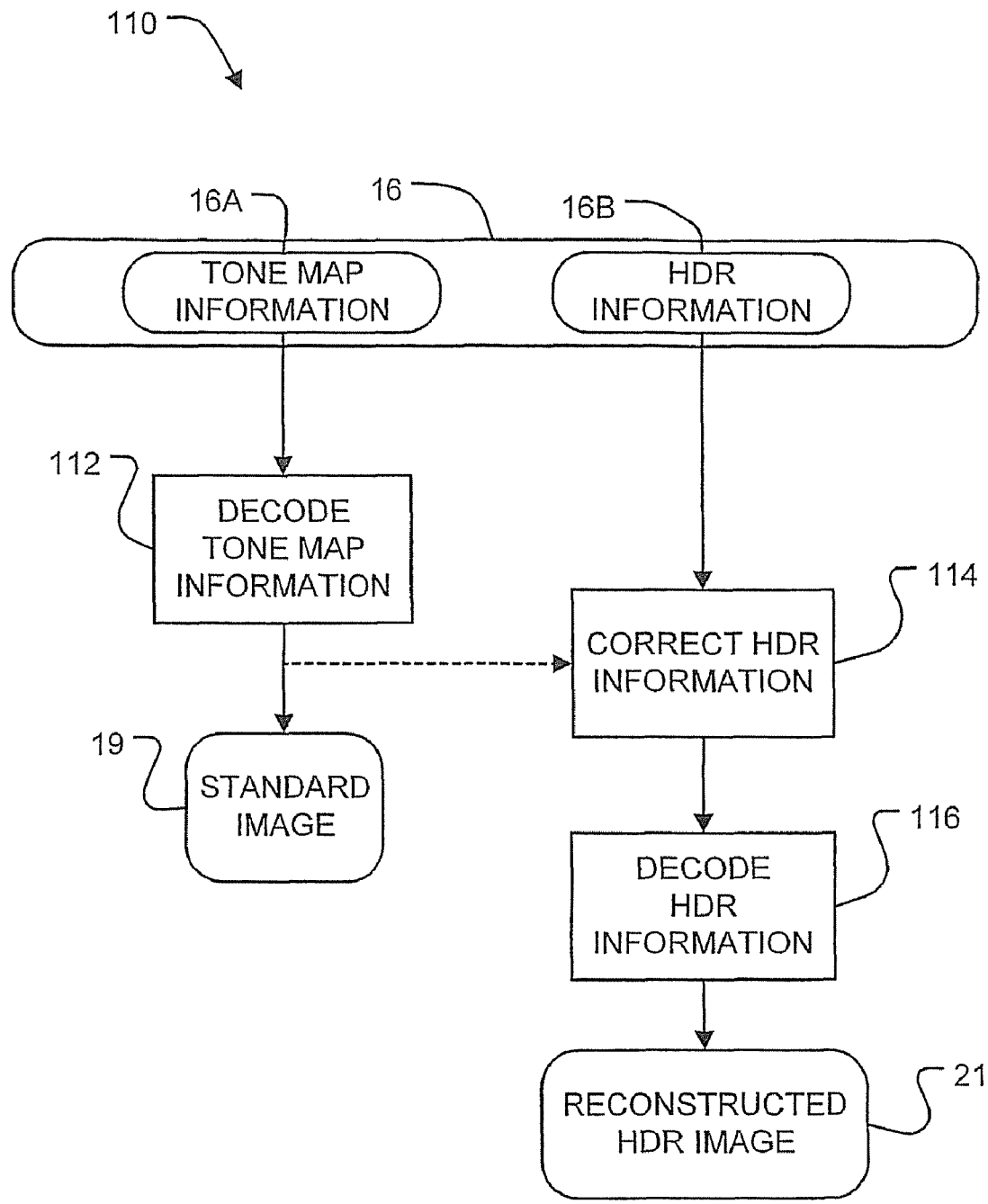

FIG. 5 is a flow chart that illustrates the operation of a method 110 which applies postcorrection to the data in HDR information portion 16B to reduce artefacts resulting from lossy encoding of HDR information portion 16B. Method 110 may be carried out on a processor capable of processing HDR images. Tone map data portion 16A is decoded at block 112 by a standard decoder to produce standard image 19. The decoded tone map information is used to correct HDR information portion 16B at block 114. The corrected HDR information is decoded at block 116 by a HDR decoder to produce reconstructed HDR image 21.

In simple cases, where the spatial frequency content of the full resolution image represented by tone map data portion 16A is substantially the same as that of ratio data 96 then corrected ratio data may be obtained by performing the calculation:

$$RI_{CORRECTED} = RI \times \frac{L(TM)}{L(TM_R)} \qquad (2)$$

where: $RI_{CORRECTED}$ is the corrected value for RI on which corrected HDR information is based; RI is the ratio for the pixel from ratio data 96; L(TM) is the luminance for the pixel from tone map data 91; and $L(TM_R)$ is the luminance for a corresponding pixel of tone map data that has been downsampled in the same manner as performed in block 72 to yield downsampled ratio data 98. The tone map data may be downsampled then upsampled again, in the same manner as the ratio image RI, so that TM and $TM_R$ have the same resolution.

This simple correction is not always adequate because the spatial frequencies present in ratio data 96 are not the same as the spatial frequencies present in tone map data 91 for all images. It is therefore preferable to include in the correction function a factor that takes into account variance in the ratio between the values of RI in ratio data 96 and the corresponding values of $L(TM_R)$. One way to take this variance into account is to generate corrected values $RI_{CORRECTED}$ according to:

$$RI_{CORRECTED} = RI \times \left(\frac{L(TM)}{L(TM_R)}\right)^\sigma \qquad (3)$$

where: σ is a measure of the variance in the ratio between the values of RI in ratio data 96 and the corresponding values of $L(TM_R)$. In some embodiments of the invention, σ is computed according to:

$$\sigma = \frac{\mathrm{var}(RI)}{\mathrm{var}(L(TM_R))} \qquad (4)$$

The variance function var(x) may be defined as a difference between the maximum and minimum values of x for pixels in a neighborhood, divided by an average value for x in the neighborhood or divided by the value for x for a pixel located centrally in the neighborhood. For example, the variance may be computed over a block of pixels centered on a pixel in question. The size of the neighborhood over which σ is computed is preferably equal to the downsampling radius for the downsampling of block 72.

As the postcorrection provided by block 114 can introduce artefacts, it is desirable to be conservative in selecting the magnitude of the correction. For example, where var(L($TM_R$)) is greater than the error which is sought to be corrected, α may be set to zero. The magnitude of the error may be determined by the comparison of block 80 and stored in data structure 16. It is also desirable to ensure that 0≦σ≦1. Allowing σ to have values such that σ>1 can result in values of $RI_{CORRECTED}$ that are undesirably high.

In embodiments of the invention which optionally perform the precorrection of blocks 82, 83 and 84 and which also permit the correction of block 83 to be performed upon viewing an HDR image, it is desirable to include a flag in data structure 16 that indicates whether or not precorrection has been performed. The flag is preferably provided in a comment field or an application extension field where it can be ignored by standard displays that do not support HDR images.

In some cases, HDR displays are capable of rendering colors that are outside of the color gamut of a conventional display. It is desirable to provide a mechanism which permits high fidelity reproduction of the colors specified by original HDR image data. One way to provide enhanced color is to scale color information so that any color having a primary component outside of a range which can be handled effectively by the encoder used to encode tone map portion 16A (which may be, for example, a JPEG or MPEG encoder) is scaled back into the range that can be handled by the encoder. The ratio data can be adjusted to correctly recover the scaled color.

One way to provide enhanced color is to apply a global desaturation to the image while creating tone map portion 16A. The amount of desaturation may be chosen to ensure that all colors in the image will be within the range which can be handled effectively by the JPEG or other encoder used to encode tone map portion 16A. This method is preferable to the method described above because it is capable of handling colors having negative primary components. Negative primary components are allowed in some HDR formats and may be necessary to represent colors outside of the standard RGB gamut. The desaturation process may be reversed during decoding by an HDR viewer.

Input color saturation level may be defined as:

$$S \equiv 1 - \frac{\min(R, G, B)}{Y} \qquad (5)$$

where: S is the saturation level; R, G and B are values for the red, green and blue primary color components respectively; and Y is the overall luminance. The saturation level will have a value greater than one if the image contains any negative values for primary color components.

Where the saturation level is zero, no additional processing of the image is needed. Where the saturation level is not zero, the saturation level may be modified according to:

$$S' = \alpha \times S^\beta \qquad (6)$$

where: α and β are parameters; and S' is the corrected saturation. The α parameter indicates how much saturation to keep in the encoded colors.

Altering the saturation level may be achieved by deriving new values for the primary components for each pixel of the image. This is performed in some embodiments according to:

$$R' = \left(1 - \frac{S'}{S}\right)Y + \frac{S'}{S}R \qquad (7)$$

and, $$G' = \left(1 - \frac{S'}{S}\right)Y + \frac{S'}{S}G \qquad (8)$$

and, $$B' = \left(1 - \frac{S'}{S}\right)Y + \frac{S'}{S}B \qquad (9)$$

where R', G' and B' are the scaled values for R, G and B respectively.

Note that this transformation does not alter the luminance, Y. The primary component that was smallest prior to the transformation remains smallest after the transformation. The original color values can be recovered by inverting equations (7), (8) and (9). For example, if the primary color component having the smallest value for a pixel were blue, then the inverse transformation for the blue channel for that pixel would be given by:

$$B = Y - Y \times \left(\frac{Y - B'}{\alpha Y}\right)^{\frac{1}{\beta}} \quad (10)$$

and the inverse transformations for the red and green channels would be given by:

$$R = Y - \frac{(Y - R')}{\alpha}\left(1 - \frac{B}{Y}\right)^{1-\beta} \quad (11)$$

and, $$G = Y - \frac{(Y - G')}{\alpha}\left(1 - \frac{B}{Y}\right)^{1-\beta} \quad (12)$$

respectively.

EXAMPLES

A number of HDR images were stored in HDR data structures 16, as described above. The original images were compared to HDR images reconstructed from HDR data structures 16. Daly's Visual Differences Predictor (VDP), as described in Daly, S., *The visual differences predictor: An algorithm for the assessment of image fidelity*, In *Digital Images and Human Vision*, A. B. Watson editor, MIT Press, Cambridge Mass., 1993, was used to evaluate what percentage of pixels in the reconstructed HDR images are likely (e.g. have a probability greater than 75%) to be perceived by humans as being different from the corresponding pixels of the original HDR image under typical viewing conditions. DP was found to be an excellent predictor of when differences could be perceived between images.

A first set of experiments involved using various tone mapping operators to produce tone map portion 16A and, for each tone map operator, correcting either tone map portion 16A or HDR information portion 16B according to one of the correction methods described above. Tone map portion 16A and HDR information 16B were each encoded using JPEG encoding at two quality levels, 90 and 100. This set of experiments yielded the results shown in Table I.

TABLE I

Image Quality for Several Tone Mapping Operators

| Tone Mapping Operator | JPEG Quality | VDP using precorrection | VDP using postcorrection |
|---|---|---|---|
| Bilateral Filter | 90 | 0.93% | 5.4% |
|  | 100 | 0.02% | 1.8% |
| Reinhard | 90 | 2.5% | 4.7% |
| Global | 100 | 0.09% | 2.8% |
| Histogram Adj. | 90 | 5.9% | 21% |
|  | 100 | 0.63% | 17% |
| Gradient | 90 | 7.5% | 36% |
|  | 100 | 3.0% | 34% |

The VDP values in Table I are averaged over a number of images. It can be seen that the selection of a tone mapping operator can have a considerable effect upon the quality of the HDR image that can be reconstructed from a HDR data structure 16. Of the tone mapping operators used in these experiments, the bilateral filter appeared to provide the best results, on average.

Certain implementations of the invention comprise computer processors which execute software instructions which cause the processors to perform a method of the invention. For example, one or more processors in a computer system may implement the methods of any of FIGS. 1 to 5 by executing software instructions in a program memory accessible to the processors. The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The instructions may optionally be present in the computer-readable signals in a compressed and/or encrypted format.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is frictionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for encoding high dynamic range image data having an initial dynamic range, the method comprising:
    obtaining tone map data corresponding to the high dynamic range image data, the tone map data having a reduced dynamic range lower than the initial dynamic range;
    processing the high dynamic range image data and the tone map data by a machine to yield ratio data, the ratio data comprising ratios of values in the high dynamic range image data and corresponding values in the tone map data;
    generating high dynamic range information based on the ratio data;
    generating tone map information based on the tone map data; and,
    storing the high dynamic range information and the tone map information in a data structure;
    wherein generating the high dynamic range information comprises applying to the ratio data a correction function, the correction function based on the tone map data;

the correction function is of the form:

$$RI_{CORRECTED} = RI \times \left(\frac{L(TM)}{L(TM_R)}\right)^{\sigma}$$

or a mathematical equivalent thereof, where:
L(TM) is the luminance for a pixel in the tone map data and L(TM$_R$) is the luminance for a corresponding pixel of tone map data that has been downsampled, and σ is a numeric Parameter;
σ is a measure of variance in the ratio of L(TM) to L(TM$_R$) where σ is computed according to:

$$\sigma = \frac{\text{var}(RI)}{\text{var}(L(TM_R))}.$$

2. A method according to claim 1 wherein the data structure comprises an image field and an application extension field and storing the high dynamic range information and the tone map information comprises storing the high dynamic range information in the application extension field and storing the tone map information in the image field.

3. A method according to claim 1 wherein generating the tone map information comprises JPEG encoding the tone map data.

4. A method according to claim 3 wherein the data structure comprises a JFIF data structure.

5. A method according to claim 4 comprising storing the high dynamic range information in an application extension of the JFIF data structure.

6. A method according to claim 4 comprising storing the high dynamic range information in a comment field of the JFIF data structure.

7. A method according to claim 6 comprising encoding the high dynamic range information as text before storing the high dynamic range information in the comment field.

8. A method according to claim 4 wherein generating high dynamic range information comprises compressing the ratio data.

9. A method according to claim 8 wherein compressing the ratio data comprises downsampling the ratio data.

10. A method according to claim 8 wherein compressing the ratio data comprises JPEG encoding the ratio data.

11. A method according to claim 1 wherein generating the tone map information comprises MPEG encoding the tone map data.

12. A method according to claim 11 wherein the data structure comprises a MPEG data structure.

13. A method according to claim 12 comprising storing the high dynamic range information in an application extension of the MPEG data structure.

14. A method according to claim 12 comprising storing the high dynamic range information in a comment field of the MPEG data structure.

15. A method according to claim 13 comprising storing the high dynamic range information for each frame of a MPEG video.

16. A method according to claim 13 comprising storing the high dynamic range information only for keyframes of a MPEG video for which conventional MPEG keyframe interpolation techniques are used to create inter-keyframe frames.

17. A method according to claim 11 wherein generating the high dynamic range information comprises compressing the ratio data.

18. A method according to claim 17 wherein compressing the ratio data comprises downsampling the ratio data.

19. A method according to claim 17 wherein compressing the ratio data comprises MPEG encoding the ratio data.

20. A method according to claim 1 wherein the tone map data is encoded by lossy encoding and the method comprises decoding the tone map data and subsequently computing the ratio data from the decoded tone map data.

21. A method according to claim 20 comprising encoding the tone map data by the lossy encoding method prior to decoding the tone map data.

22. A method according to claim 20 wherein storing the tone map information comprises storing the encoded tone map data.

23. A method according to claim 22 wherein generating the high dynamic range information comprises compressing the ratio data to yield compressed ratio data.

24. A method according to claim 23 wherein compressing the ratio data comprises performing a lossy compression of the ratio data.

25. A method according to claim 24 wherein compressing the ratio data comprises downsampling the ratio data.

26. A method according to claim 24 wherein compressing the ratio data comprises JPEG encoding the ratio data.

27. A method according to claim 24 wherein compressing the ratio data comprises MPEG encoding the ratio data.

28. A method according to claim 23 wherein generating the tone map information comprises reconstructing the ratio data from the compressed ratio data and dividing the high dynamic range image data by the reconstructed ratio data.

29. A method for encoding high dynamic range image data having an initial dynamic range, the method comprising:
  obtaining tone map data corresponding to the high dynamic range image data, the tone map data having a reduced dynamic range lower than the initial dynamic range;
  processing the high dynamic range image data and the tone map data by a machine to yield ratio data, the ratio data comprising ratios of values in the high dynamic range image data and corresponding values in the tone map data;
  generating high dynamic range information based on the ratio data;
  generating tone map information based on the tone map data; and,
  storing the high dynamic range information and the tone map information in a data structure;
  wherein:
  the tone map data is encoded by lossy encoding and the method comprises decoding the tone map data and subsequently computing the ratio data from the decoded tone map data;
  storing the tone map information comprises storing the encoded tone map data;
  generating the high dynamic range information comprises compressing the ratio data to yield compressed ratio data;
  generating the high dynamic range information comprises applying to the ratio data a correction function, the correction function based on the tone map data;
  the correction function is of the form:

$$RI_{CORRECTED} = RI \times \left(\frac{L(TM)}{L(TM_R)}\right)^{\sigma}$$

or a mathematical equivalent thereof, where:
L(TM) is the luminance for a pixel in the tone map data and L(TM$_R$) is the luminance for a corresponding pixel of tone map data that has been downsampled, and σ0 is a numeric parameter;
σ is a measure of variance in the ratio of L(TM) to L(TM$_R$) and σ is computed according to:

$$\sigma = \frac{\text{var}(RI)}{\text{var}(L(TM_R))}.$$

30. A method according to claim 1 wherein generating the high dynamic range information comprises computing a mathematical function of the ratio data.

31. A method according to claim 30 wherein the mathematical function comprises a logarithm computation.

32. A method according to claim 1 wherein obtaining the tone map data comprises generating the tone map data with a tone mapper without chopping colour or luminance values.

33. A method according to claim 1 wherein obtaining the tone map data comprises generating the tone map data with a tone mapper which maintains colour and luminance ratios for each pixel of the tone map data.

34. Apparatus for encoding high dynamic range image data having an initial dynamic range, the apparatus comprising:
 means for computing ratio data, the ratio data comprising ratios of values in the high dynamic range image data to corresponding values in tone map data corresponding to the high dynamic range image data, the tone map data having a reduced dynamic range lower than the initial dynamic range;
 means for generating high dynamic range information based on the ratio data;
 means for generating tone map information based on the tone map data; and,
 means for storing the high dynamic range information and the tone map information in a data structure;
 wherein generating the high dynamic range information comprises applying to the ratio data a correction function, the correction function based on the tone map data;
 the correction function is of the form:

$$RI_{CORRECTED} = RI \times \left(\frac{L(TM)}{L(TM_R)}\right)^{\sigma}$$

or a mathematical equivalent thereof, where:
L(TM) is the luminance for a pixel in the tone map data and L(TM$_R$) is the luminance for a corresponding pixel of tone map data that has been downsampled, and σ is a numeric Parameter;
σ is a measure of variance in the ratio of L(TM) to L(TM$_R$), where σ is computed according to:

$$\sigma = \frac{\text{var}(RI)}{\text{var}(L(TM_R))}.$$

35. A method according to claim 14 comprising storing the high dynamic range information for each frame of a MPEG video.

36. A method according to claim 14 comprising storing the high dynamic range information only for keyframes of a MPEG video for which conventional MPEG keyframe interpolation techniques are used to create inter-keyframe frames.

* * * * *

UNITED STATES PATENT AND TRADEMARK OFFICE
CERTIFICATE OF CORRECTION

PATENT NO.      : 8,218,625 B2
APPLICATION NO. : 11/568030
DATED           : July 10, 2012
INVENTOR(S)     : Gregory John Ward et al.

Page 1 of 1

It is certified that error appears in the above-identified patent and that said Letters Patent is hereby corrected as shown below:

On the cover page, the PCT filing date "Nov. 24, 2004" is changed to --Dec. 24, 2004--;
In col. 2, ln. 57, "flow chair" is changed to --flow chart--;
In col. 3, ln. 6, "ODR images" is changed to --HDR images--;
In col. 6, ln. 13, "call be read" is changed to --can be read--;
In col. 6, ln. 56, "a compressing ratio data" is changed to --compressing ratio data--;
In col. 7, ln. 17, "suitable maimer" is changed to --suitable manner--;
In col. 7, ln. 21, "embodiments of the inventions" is changed to --embodiments of the invention--;
In col. 11, ln. 42, "DP" is changed to --VDP--.

Signed and Sealed this
Thirtieth Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,218,625 B2 | Page 1 of 1 |
| APPLICATION NO. | : 11/568030 | |
| DATED | : July 10, 2012 | |
| INVENTOR(S) | : Gregory John Ward et al. | |

It is certified that error appears in the above-identified patent and that said Letters Patent is hereby corrected as shown below:

In col. 12, ln. 36, "frictionally equivalent" is changed to --functionally equivalent--.

Signed and Sealed this
Nineteenth Day of March, 2013

Teresa Stanek Rea
*Acting Director of the United States Patent and Trademark Office*